(12) United States Patent
DeWulf (10) Patent No.: US 6,590,528 B1
(45) Date of Patent: Jul. 8, 2003

(54) LOW COST INTERFERENCE REDUCTION SYSTEM FOR GPS RECEIVERS

(75) Inventor: Thomas V. DeWulf, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 76 days.

(21) Appl. No.: 10/005,237

(22) Filed: Dec. 5, 2001

(51) Int. Cl.[7] .................... H04B 7/185; G01S 5/02
(52) U.S. Cl. .................... 342/357.12; 342/383
(58) Field of Search .............. 342/16, 357.06, 342/357.12, 378, 383

(56) References Cited

U.S. PATENT DOCUMENTS

| | | | | |
|---|---|---|---|---|
| 5,107,273 A | * | 4/1992 | Roberts | 342/417 |
| 5,952,968 A | * | 9/1999 | McDowell | 342/383 |
| 6,107,960 A | * | 8/2000 | Krasner | 342/357.09 |
| 6,175,327 B1 | * | 1/2001 | Lin et al. | 342/357.06 |
| 6,205,190 B1 | * | 3/2001 | Antonio et al. | 375/346 |

* cited by examiner

Primary Examiner—Dao Phan
(74) Attorney, Agent, or Firm—Nathan O. Jensen; Kyle Eppele (57) ABSTRACT

A low-cost interference reduction system reduces interfering and jamming signals in a global positioning system receiver for such applications as rotating weapons and hand-held GPS receivers. A pair of antennas having a spin symmetric gain pattern receive global positioning system signals and interfering signals. An antijam electronics function connected to the antennas processes the global positioning system signals and the interfering signals to produce an output signal with reduced interfering signal levels. The global positioning system receiver is connected to the antijam electronics function for processing the global positioning system signals into position solutions and for providing a power detector output and a clock output to the antijam electronics function.

20 Claims, 11 Drawing Sheets

LOW COST INTERFERENCE REDUCTION SYSTEM FOR GPS RECEIVERS

BACKGROUND OF THE INVENTION

This invention relates to the global positioning system (GPS), GPS receivers, and interference reduction in GPS receiver systems. The invention may be used in rotating weapons, handheld GPS receivers, and any other GPS system requiring a low-cost interference reduction system.

Global positioning systems, such as the US NAVSTAR GPS and Russian GLONASS, are known. The NAVSTAR GPS developed by the U.S. Department of Defense is a satellite-based radio navigation system that transmits information from which extremely accurate navigational calculations can be made in three-dimensional space anywhere on or near the Earth. Three-dimensional velocity can be determined with similar precision. GPS uses eighteen to twenty-four satellites that may be evenly dispersed in three inclined twelve-hour circular orbits chosen to ensure continuous twenty-four hour coverage worldwide. Each satellite uses extremely accurate cesium and rubidium vapor atomic clocks for generating a time base. Each satellite is provided with clock correction and orbit information by Earth-based monitoring stations. Each satellite transmits a pair of L-band signals. The pair of signals includes an L1 signal at a frequency of 1575.42 MHz and an L2 signal at a frequency of 1227.6 MHz. The L1 and L2 signals are biphase signals modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The ephemeris data is used in conjunction with a set of Keplerian equations to precisely determine the location of each satellite. The receiver measures a phase difference (i.e., time of arrival) of signals from at least four satellites. The time differences are then used to solve a matrix of four equations. The result is a precise determination of the location of the receiver in three-dimensional space. Velocity of the receiver may be determined by a precise measurement of the L1 and L2 frequencies. The measured frequencies are used to determine Doppler frequency shifts caused by differences in velocity. The measured differences are used to solve another set of equations to determine the velocity based upon the Doppler phase shift of the received signal.

GPS signals are very low in amplitude and are transmitted using a spread-spectrum signal bandwidth centered at 1575.42 MHz. The GPS signals cover a frequency spread of about 20 MHz. GPS receivers are subject to disruption by jammer signals, which may be transmitted either as narrow band signals or broadband signals. Known GPS receiver systems may reduce the effects of narrow band jamming by using frequency-selective filters, such as notch filters, to attenuate the jamming signal. However, broad band jamming signals are more difficult to reduce or eliminate as the frequency spread of the jamming signals approximates the frequency spread of the GPS signal. Because the frequency spreading sequence of the GPS signal is encrypted according to a pseudo-random noise code, the jammer cannot be precisely synchronized to the GPS signal. This permits the effects of the jamming signal to be reduced by nulling-out the jamming signal. Further, the signal strength of the jamming signal is typically much greater than the signal strength of the GPS signal.

Interference and jamming suppression and/or cancellation are a pressing need in military receivers. Cost and size of interference canceling systems such as null steering or beam forming systems have limited their use to GPS systems installed on the most high value platforms such as aircraft and ships.

Null steering techniques are known in the art. These nulling techniques are based on determining an angle of arrival of a signal based on the phase shift of the signal observed at different antenna elements of an antenna array. Various weights or weight values are assigned to each antenna element and are used to adjust the phase and level of attenuation of the received signal in an attempt to null-out the jammer signal. Power minimization is a known technique that attempts to adjust the weights so as to reduce the total measured power coming from the antenna array. Power minimization techniques rely on the assumption that the jammer signal is much stronger than the GPS signal and that it emanates from a different single direction of arrival. An array having multiple antenna elements is spatially selective so that a null can be placed in the direction of the jammer by adjusting the weight values. Various known algorithms, such as least mean squares and direct matrix inversion may be used to implement the power minimization technique in digital systems. In power minimization techniques, it is assumed that almost all of the signal power is due to the jammer component, and not due to the GPS signal, because the GPS signal is very weak and therefore provides no significant power contribution.

Recent size reductions in GPS receivers have permitted a new capability for them to be use small form factor weapon systems such as bombs, missiles, rockets, and artillery shells. These new platforms are extremely sensitive to cost and sometimes have requirements for an airframe that is continuously rolling and have high launch shock such as artillery shells. Additionally, if they are to be used for military purposes, resistance to interference and jamming is highly desired.

Handheld GPS receivers are widely used in military applications. Handheld GPS receivers would also benefit from a low-cost small size interference reduction system.

What is needed is a very low-cost interference reduction system specifically designed for use in weapons systems having such requirements as small size, a rolling airframe, and high-g acceleration when a shell is fired. It is also desirable to be able to incorporate the low-cost interference reduction system in handheld GPS receivers.

SUMMARY OF THE INVENTION

A low-cost interference reduction system for a global positioning system receiver is disclosed. The low-cost interference reduction system may be used in rotating weapons such as artillery projectiles and in hand-held GPS receivers. The low-cost interference reduction system comprises a reference antenna and a secondary antenna for receiving global positioning system signals and interfering signals. A complex weight circuit adjusts the phase and gain of the secondary antenna signal by varying the gain of the in-phase and quadrature component of the secondary antenna signal. A summing function adds the reference antenna signal to the complex multiplied secondary antenna signal to reduce the interfering signals. The GPS receiver processes the global positioning system signals into position solutions and provides a power detector output and a clock output. A microprocessor receives and measures the power detector output and uses the measurement along with the clock output from the GPS receiver to generate the in-phase and quadrature gain signals for the complex weight circuit such that the interfering signals are reduced. Amplifier and filter functions are connected to the reference and secondary antennas, the summing function, and the complex weight circuit to filter and amplify the received GPS and jamming signals. A digital attenuator is connected to the output of the summing function and the microprocessor to reduce the level of the received signals so as to maintain them within the range of an AGC circuit in the GPS receiver. A digital-to-analog converter is connected to the microprocessor and the complex weight circuit to convert the in-phase and quadrature gain signal from digital to analog. The GPS receiver further comprises an AGC function for controlling signal levels in the GPS receiver and for providing the power detector output.

It is an object of the present invention to provide a low-cost interference reduction system for use with GPS receivers.

It is an object of the present invention to provide a low-cost interference reduction system for use in rotating weapons incorporating GPS receivers.

It is an object of the present invention to provide a low-cost interference reduction system for use in hand-held GPS receivers.

It is an advantage of the present invention to maintain interference cancellation in the presence of a high roll rate by the use spin symmetrical antennas in the interference reduction system.

It is an advantage of the present invention to reduce cost by the use of power detector and clock signals from the GPS receiver.

It is a feature of the present invention to reduce interference and jamming signals from several directions.

It is a feature of the present invention to acquire and receive GPS signals and to direct a null toward a jammer when installed in a continually spinning platform.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
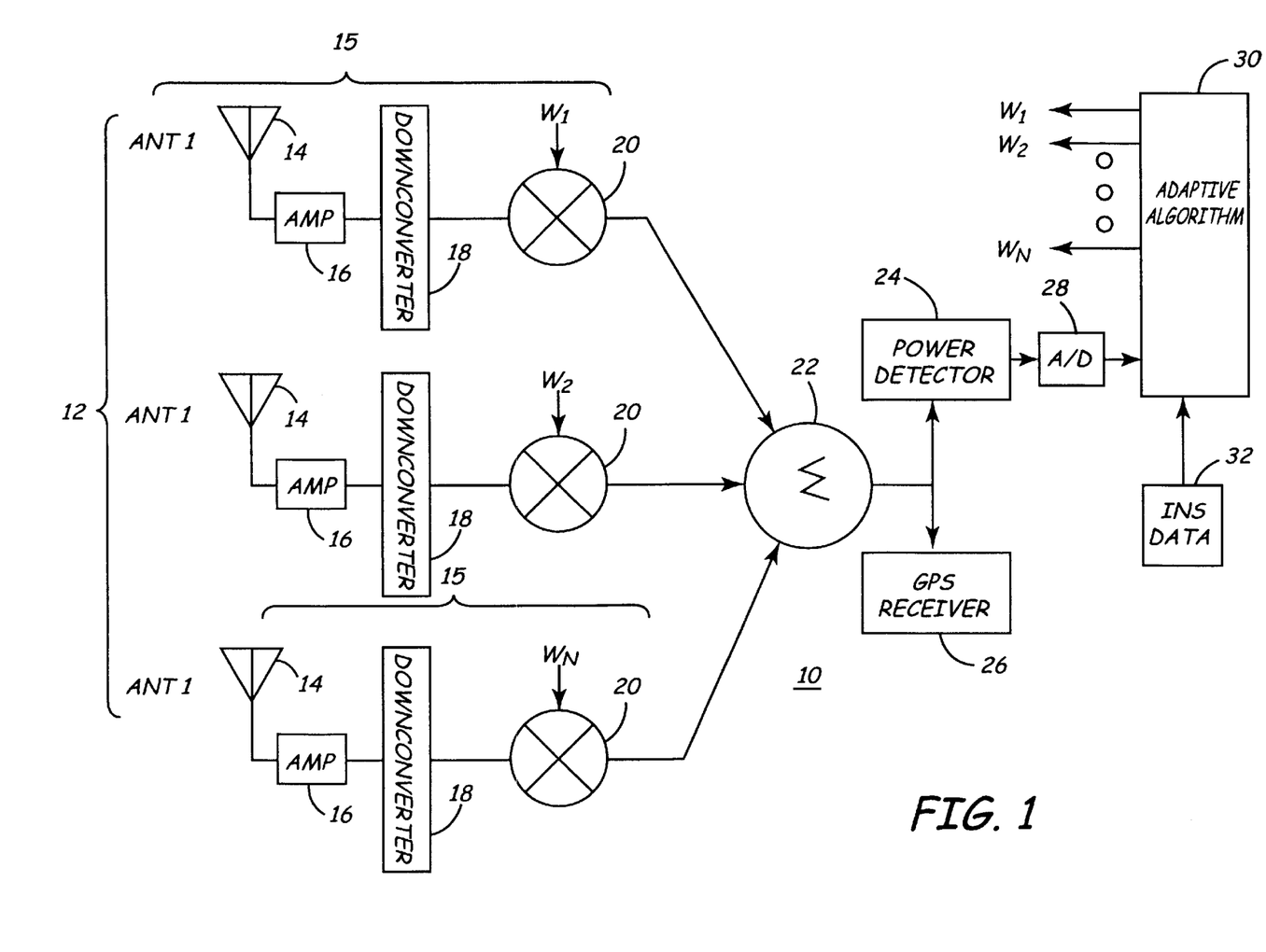
FIG. 1 is a block diagram of a null steering system for use with a GPS receiver in high value platforms.

A block diagram of a null steering system 10 for use in high value platforms is shown in FIG. 1 for use with a GPS receiver 26 as disclosed in U.S. Pat. No. 5,952,968 incorporated herein by reference. The system 10 includes an antenna array 12 having a plurality of antenna elements 14, where the components comprising each antenna leg portion 15 are substantially identical. In FIG. 1, each antenna element 14 is coupled to a low noise amplifier 16, the output of which is supplied to a down-converter 18 to convert the signal to an intermediate frequency for processing. Each down-converted signal is supplied to weighting circuits 20 that multiply the signals by complex weight values having real and imaginary portions. The outputs of all of the weighting circuits 20 are coupled to a summing circuit 22, as shown.

In FIG. 1, the sum of the signals from the summing circuit 22 is then coupled to a power detector circuit 24 and is also supplied to the GPS receiver 26. The output of the power detector circuit 24 is then converted to a digital signal by an analog to digital converter 28. The digital signal is then processed by an adaptive algorithm under control of a microprocessor or other suitable computer or processor 30. Alternately, dedicated or discrete hardware circuitry may be used in place of the microprocessor 30. In FIG. 1, the microprocessor 30 adjusts the values of the weight values for each antenna element 14 and iteratively processes the digital signal attempting to constantly improve the signal received by the GPS receiver 26. Additionally, navigational data, such as data provided by an inertial navigation system (INS or NAV system) 32 may be utilized by the adaptive algorithm under control of the microprocessor 30.

In FIG. 1, only a single set of weights 20 is required. One weight 20 corresponds to one antenna element 14. Therefore, the single set of weights corresponds to the array 12 of antenna elements 14, which is optimized for all of the GPS satellites. The NAV system 32 provides information with respect to the position and/or orientation of the receiver (the antenna array of the receiver) that permits the system 10 to solve for the gain of the received GPS signal in the direction of each satellite. In FIG. 1, one set of weights 20 in combination with the NAV data is used to optimize the average signal to noise ratio (SNR). Accordingly, the gain of the received GPS signal is increased.

To perform this optimization of the SNR in the embodiment of FIG. 1, the total power received by the antenna array 12 is divided by the measurement bandwidth to obtain a noise floor. Using the positional information provided by the NAV system 32, the gain in the direction of the satellite may be obtained. This value can then be used as the criteria for increasing the SNR by adjusting the value of the weights 20 via an adaptive algorithm, such as a "hill climbing" algorithm. Therefore, instead of merely reducing the total power received, as is done in known power minimization techniques, the system adjusts the weights 20 to maximize the SNR, meaning that the signal strength of the received GPS signal is boosted, while simultaneously minimizing the jamming signal.

Because each antenna element 14 is part of the antenna array 12, each element has a different carrier phase due to its relative position with respect to each satellite. GPS receiver systems utilizing an antenna array 12 are useful for nulling the effects of broad band jamming signals. In some situations, multiple jammer signals may be present. To null-out N number of different jammer signals, N+1 individual antenna elements 14 are utilized. For example, four antenna elements 14 are used to effectively null-out three jammer signals.

The GPS signal may be below the noise level. One aspect of the system in FIG. 1 utilizes the fact that the GPS signal is extremely weak relative to the strength of the jammer signal. Additionally, the jamming signal typically emanates from a different direction than that of the GPS signal. Often, the GPS signal is transmitted from a satellite that is relatively high in sky, while the jamming signal is transmitted from a tower or mobile vehicle located on the ground. Hence, the signals arrive from different directions. If the jamming signal emanates from an airborne platform and is at the same relative position as that of the satellite, no difference in the angle of arrival between the GPS signal and the jammer signal would be seen, and nulling would be very difficult. However, this is a rare occurrence and would only be temporary.

As described above, the illustrated embodiment of the system 10 of FIG. 1 utilizes a single set of weights 20 for the entire antenna array 12. For each antenna element 14, processing the signal in accordance with the weight 20 causes the phase and/or amplitude of the received signal to be modified in an attempt to "steer" a null in the direction of the jamming signal to reduce its received signal strength, while simultaneously increasing the gain of the received signal in the direction of the GPS satellite.

The system of FIG. 1 offers high performance advantages in jammer nulling for high value platforms such as ships and aircraft. However the system of FIG. 1 is quite large and expensive and not suitable for such applications as weapon systems and compact low-cost hand held GPS receivers.

Figure 2:
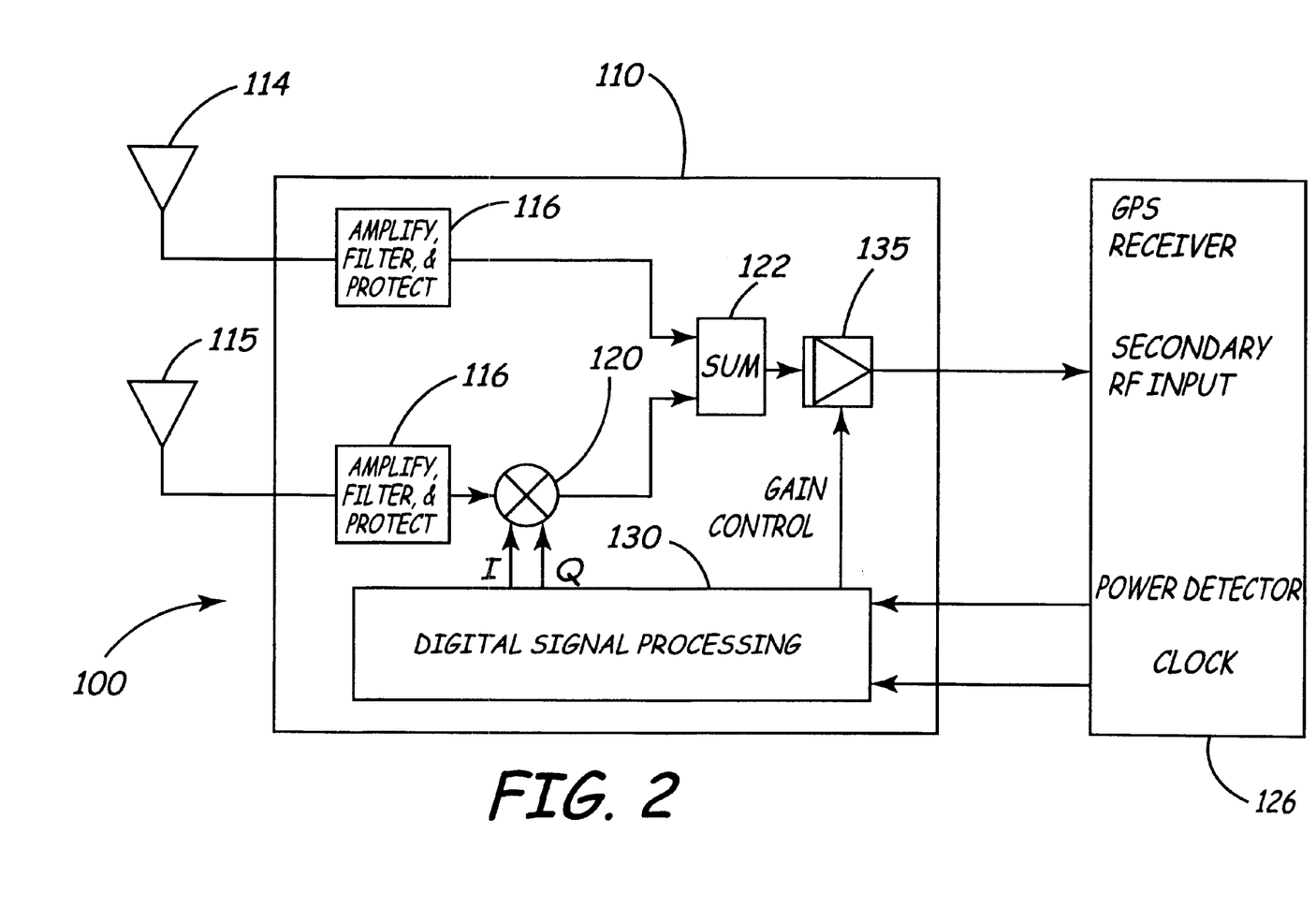
FIG. 2 is a block diagram of a low-cost interference reduction system the present invention.

FIG. 2 is a block diagram of a low-cost interference reduction system 100 the present invention. The low-cost interference reduction system 100 comprises an antijam (A/J) electronics unit 110, a GPS receiver 126, and two antennas 114 and 115. The two antennas 114 and 115 have a roll symmetric or omnidirectional radiation pattern. The antennas may be slot antennas, circumferential band antennas, or dual dipole antennas that are oriented along the roll axis of the weapon (or whichever axis is spinning). Because the antennas are spin-symmetric, the platform may be continually spinning without adversely affect the GPS signal reception or nulling capability of the interference reduction system 100.

The output of antenna 114 serves as a reference and is processed by amplifying and filtering in block 116. Antenna 115 functions as a secondary antenna 115 and its output is also amplified and filtered in an identical block 116. The secondary antenna 115 output after amplifying and filtering is adjusted in phase and gain with a complex weight circuit 120 so that any interference is equal in magnitude but opposite in phase with respect to the reference antenna 114. The output of the complex weight circuit 120 is added to the reference antenna 114 amplified and filtered output signal in a summing element 122. The summing element 122 output signal has the desired GPS signals with reduced or cancelled interfering or jamming signals that were present on the reference antenna 114.

The complex weight circuit 120 receives in-phase (I) and quadrature (Q) gain signals from a digital signal processing circuit 130 to adjust the phase and again of the secondary antenna 115 signals. The digital signal processing circuit 130 receives a power detector feedback signal from an AGC circuit (not shown) that functions as a power detector in the GPS receiver 126 to detect the level of cancellation achieved. The digital signal processing circuit 130 measures this power detector signal level and then continuously adjust the gain and phase of the secondary antenna 115 signal by varying the I and Q gain signals to the complex weight circuit 120 to produce a minimum interfering signal level in the power detector. A digital attenuator 135 following the summing element 122 keeps the summing element output signal level within the operating range of the AGC circuit of the GPS receiver 126. The digital signal processing circuit 130 provides a gain control signal to the digital attenuator 135. The interference cancellation system 100 also uses a reference clock from the GPS receiver 126 to reduce the parts count, size, and cost.

Figure 3:
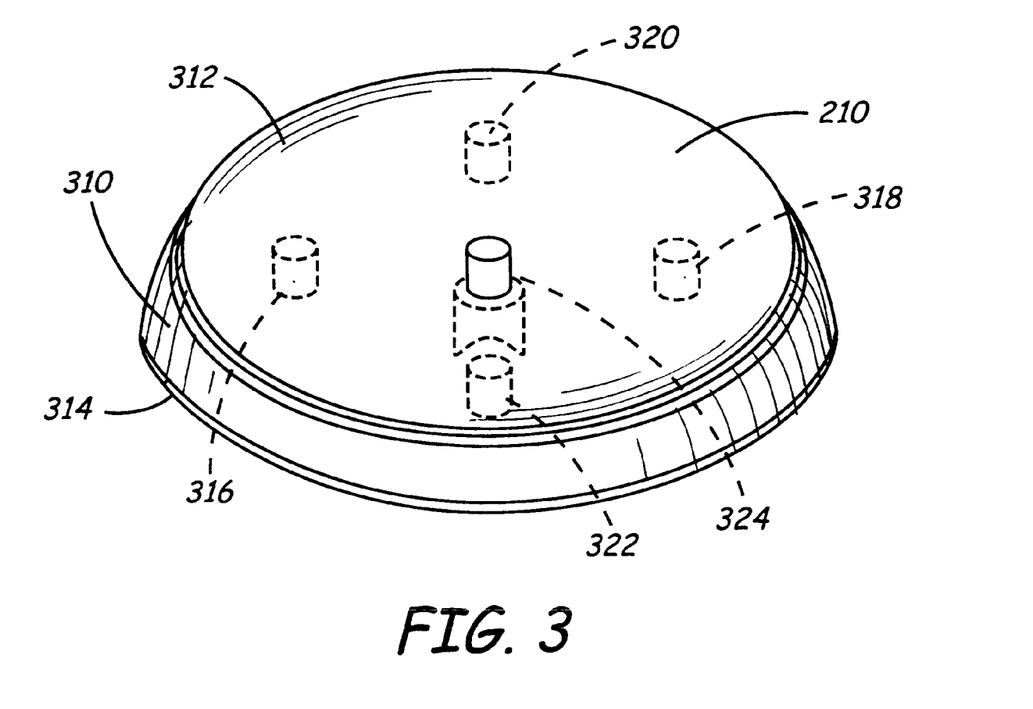
FIG. 3 is a diagram of a slot antenna that may be used for the two antennas of FIG. 2.

An antenna such as that disclosed in U.S. Pat. No. 6,098,547 incorporated herein by reference in is entirety may be used in the present invention. FIG. 3 is a diagram of a circumferential slot antenna 210 disclosed in the referenced patent that may be used for both the antennas 114 and 115 of FIG. 2. The slot antenna 210 may have a radiation pattern symmetric about the center feed point 324. The antenna 210 consists of two conducting discs 312 and 314 that act as ground planes spaced apart by a dielectric disk 310. Apertures 316–322 are used to tune the antenna 210. The diameter of the antenna may be also varied to adjust the frequency and bandwidth of the antenna.

Figure 4:
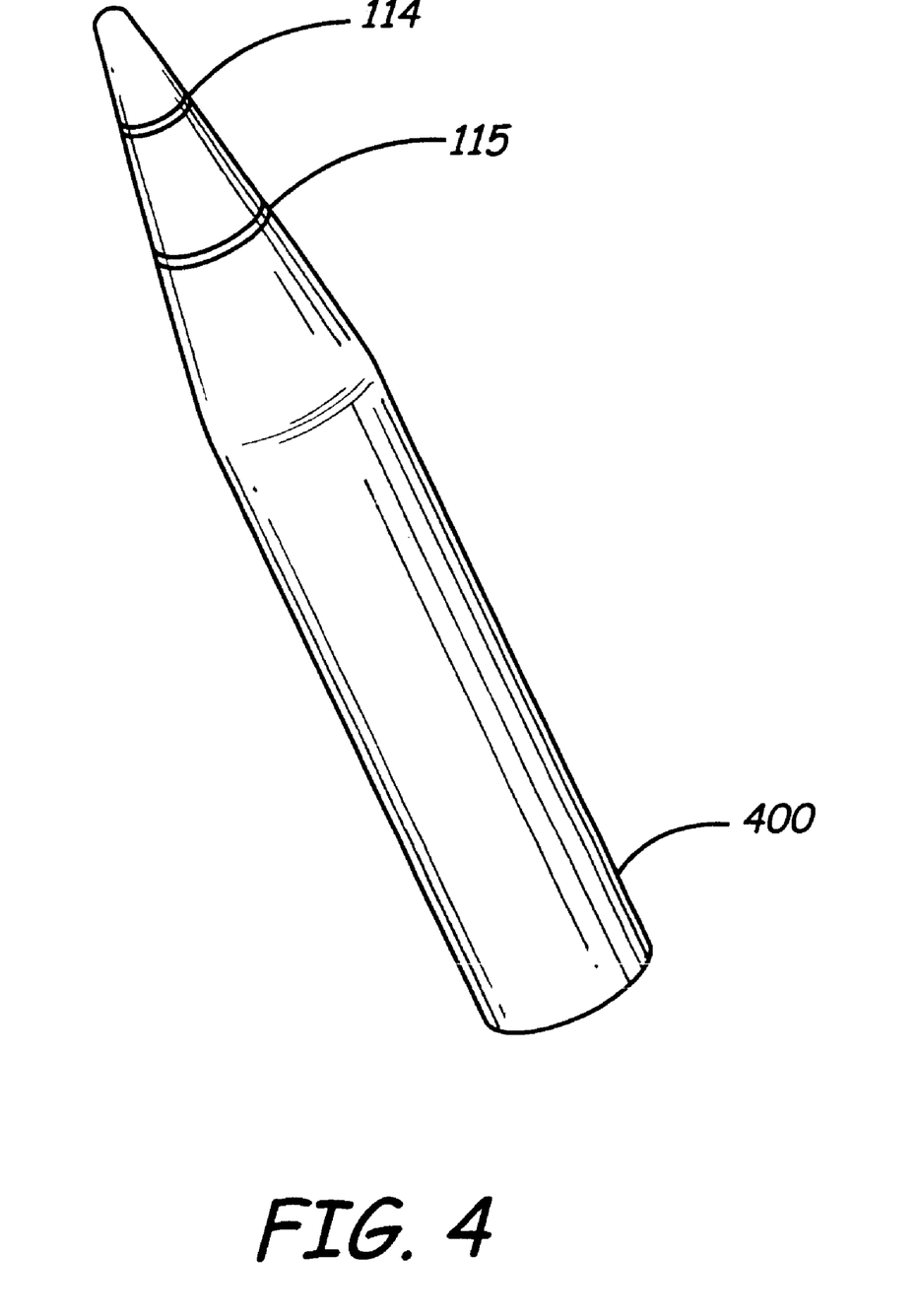
FIG. 4 is a diagram of an artillery projectile incorporating the present invention.

A circumferential band antenna may also be used for antennas 114 and 115 as shown in FIG. 4. A circumferential band antenna may be a conducting band wrapped around the outer circumference of artillery projectile 400.

Antennas 114 and 115 on the projectile 400 in FIG. 4 may also be the slot antenna 210 shown in FIG. 3. The antennas 114 and 115 are positioned with the edge of the slot at the outer surface of the projectile 400. The positions of antennas 114 and 115 may be interchanged from that shown in FIG. 4. Also, note that the size of the antennas may be different to fit the projectile 400 as shown in FIG. 4. The antennas 114 and 115 are positioned in the projectile 400 such that they are roll symmetric with the projectile. The antennas 114 and 115 are spaced at approximately one half wavelength at the GPS frequencies. Both antennas 114 and 115 require a common ground and the projectile structure around the antennas must be grounded for proper antenna functioning.

Figure 5:
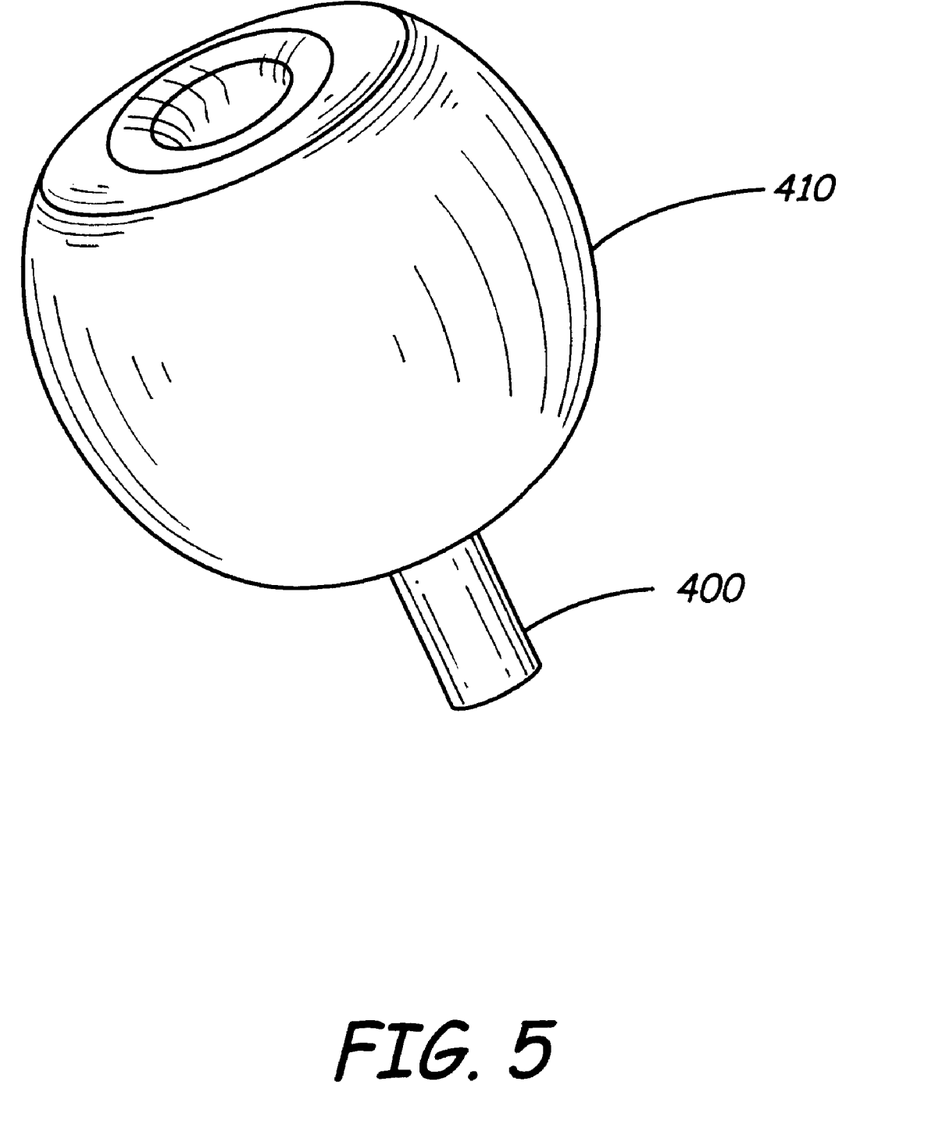
FIG. 5 shows the projectile and a gain pattern of the two antennas with no jamming signal.
Figure 6:
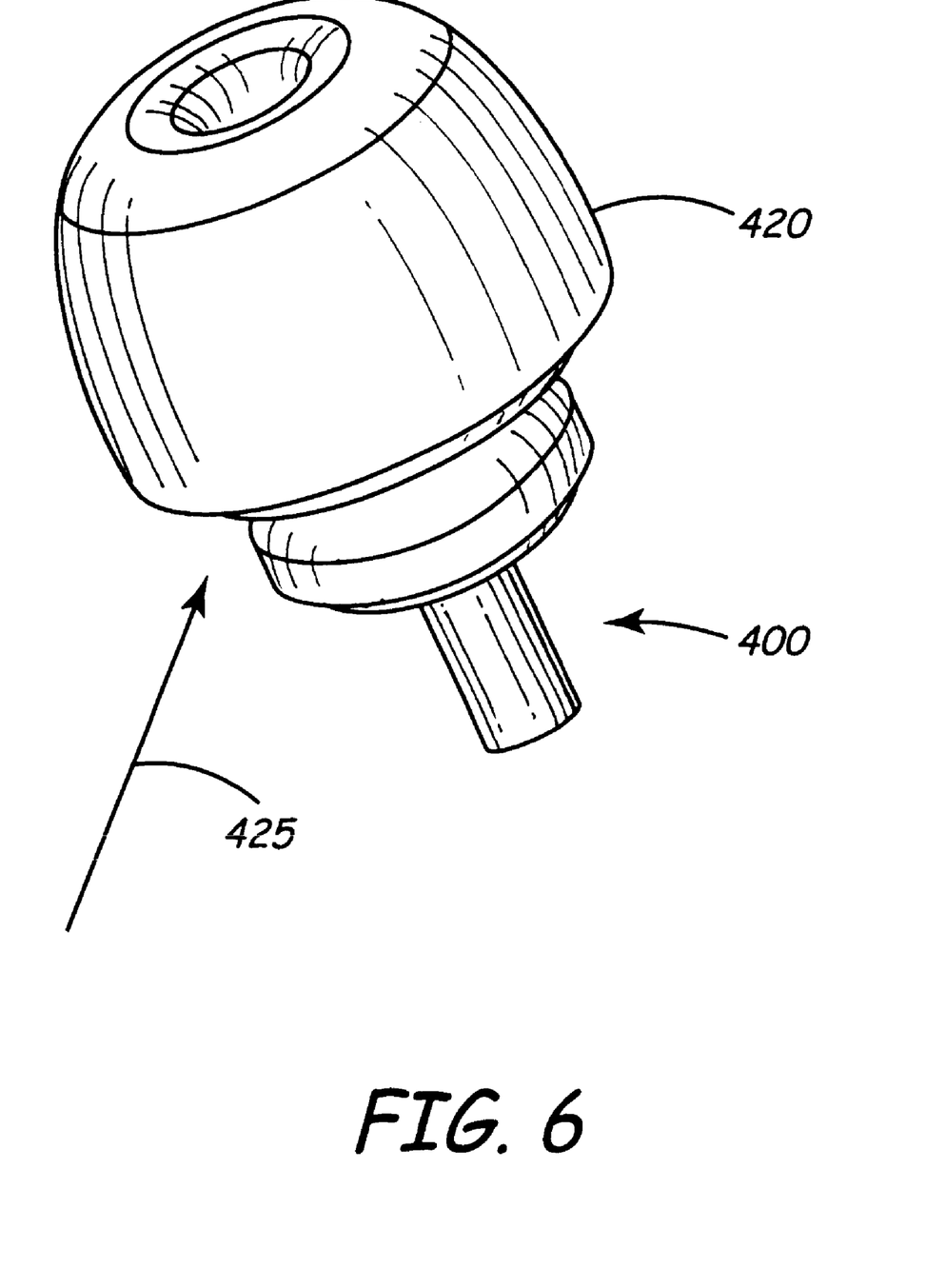
FIG. 6 shows a gain or radiation pattern of the two antennas with a jammer signal coming from an angle toward the rear of the projectile.
Figure 7:
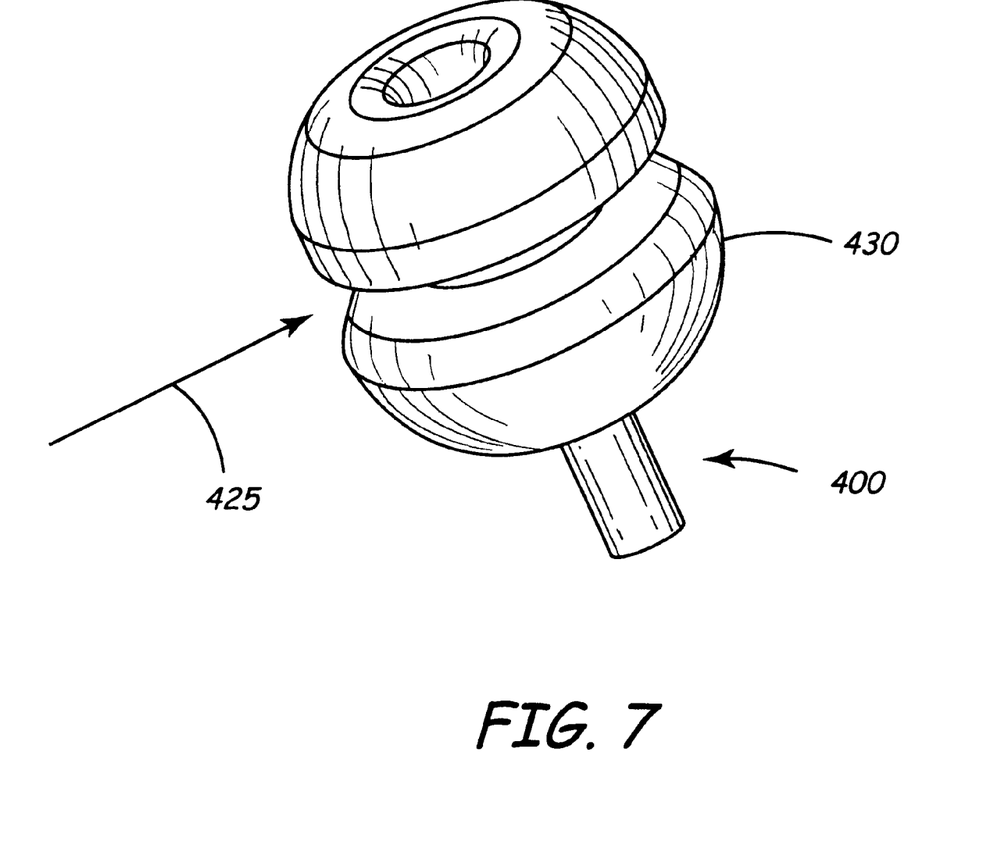
FIG. 7 shows another gain pattern with the jammer signal from an angle perpendicular to the projectile with the resulting null toward the jammer.
Figure 8:
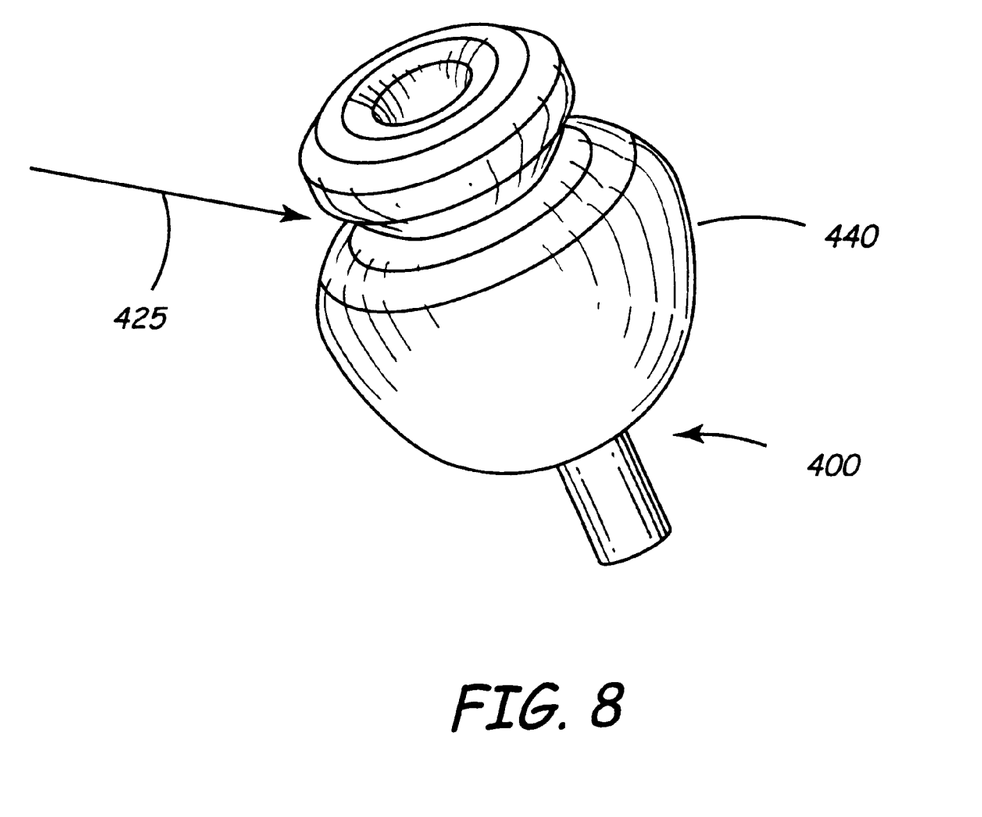
FIG. 8 shows another gain pattern resulting from the jammer signal arriving from an angle off to the front of the projectile.

FIG. 5 shows the projectile 400 and a gain pattern 410 of the two antennas 114 and 115 with no jamming signal. FIG. 6 shows a gain or radiation pattern 420 of two antennas 114 and 115 with a jammer signal indicated by arrow 425 coming from an angle toward the rear of the projectile 400. Note that a null in the gain pattern is directed toward the jammer signal 425 as well as in a complete ring around the projectile. FIG. 7 shows another gain pattern 430 with the jammer signal 425 from an angle perpendicular to the projectile 400 with the resulting null toward the jammer. FIG. 8 shows another gain pattern 440 resulting from the jammer signal 425 arriving from an angle off to the front of the projectile 400. The antennas 114 and 115 have a roll symmetric pattern as shown in FIG. 5. With this roll symmetric pattern, the cancellation pattern is also roll symmetric as shown in FIGS. 6, 7, and 8.

Figure 9:
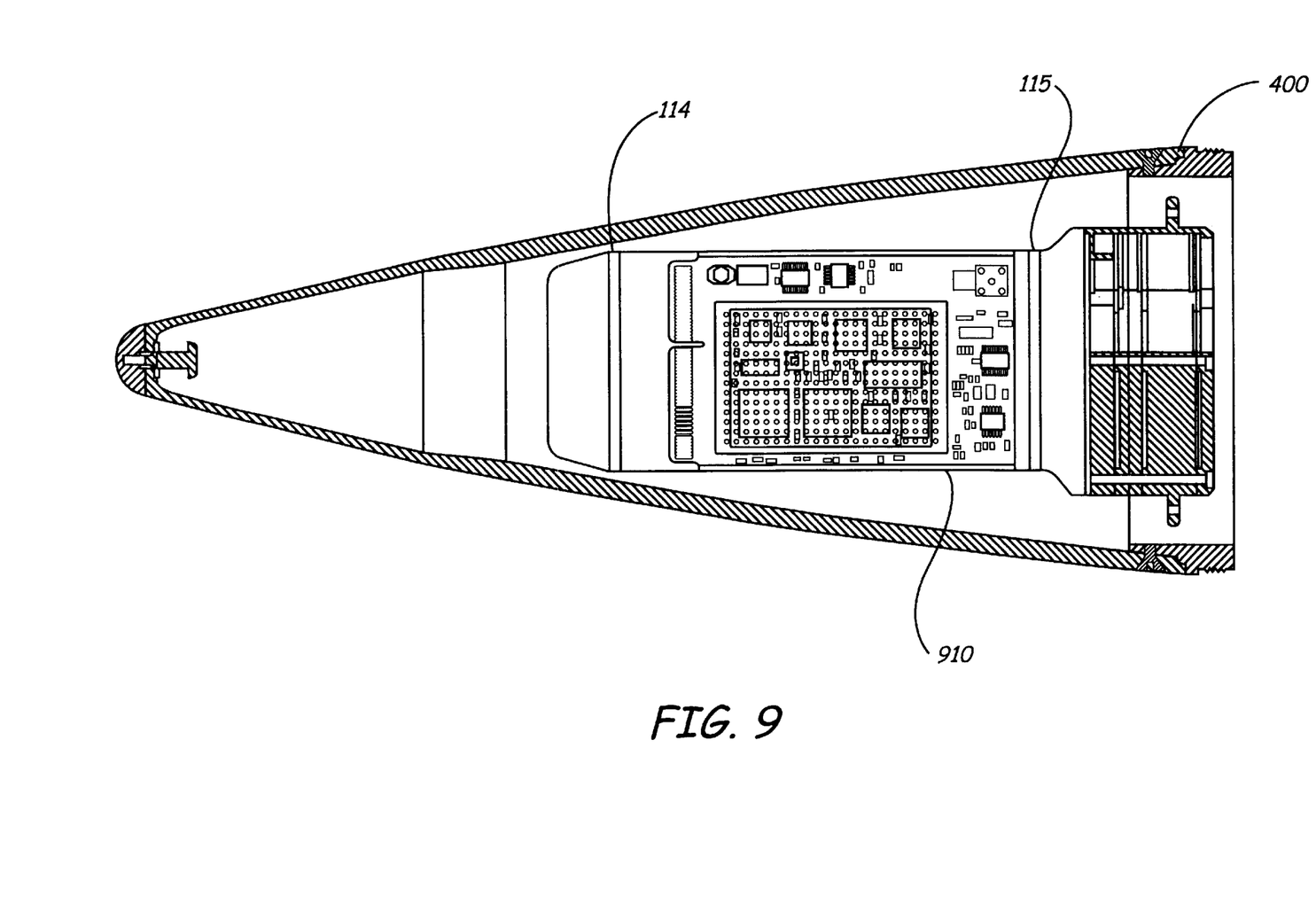
FIG. 9 is a diagram showing a portion of the artillery projectile with a possible position for a circuit board containing the circuit functions of the interference reduction system of the present invention.

FIG. 9 is a diagram showing a portion of the artillery projectile 400 with a possible position for a circuit board 910 containing the circuit functions of the interference reduction system 100. The antennas 114 and 115 are located on an assembly with the circuit board 910 as shown in FIG. 9. With this embodiment, the outer skin of the projectile may be a radome made of material transparent to the GPS signals.

Figure 10:
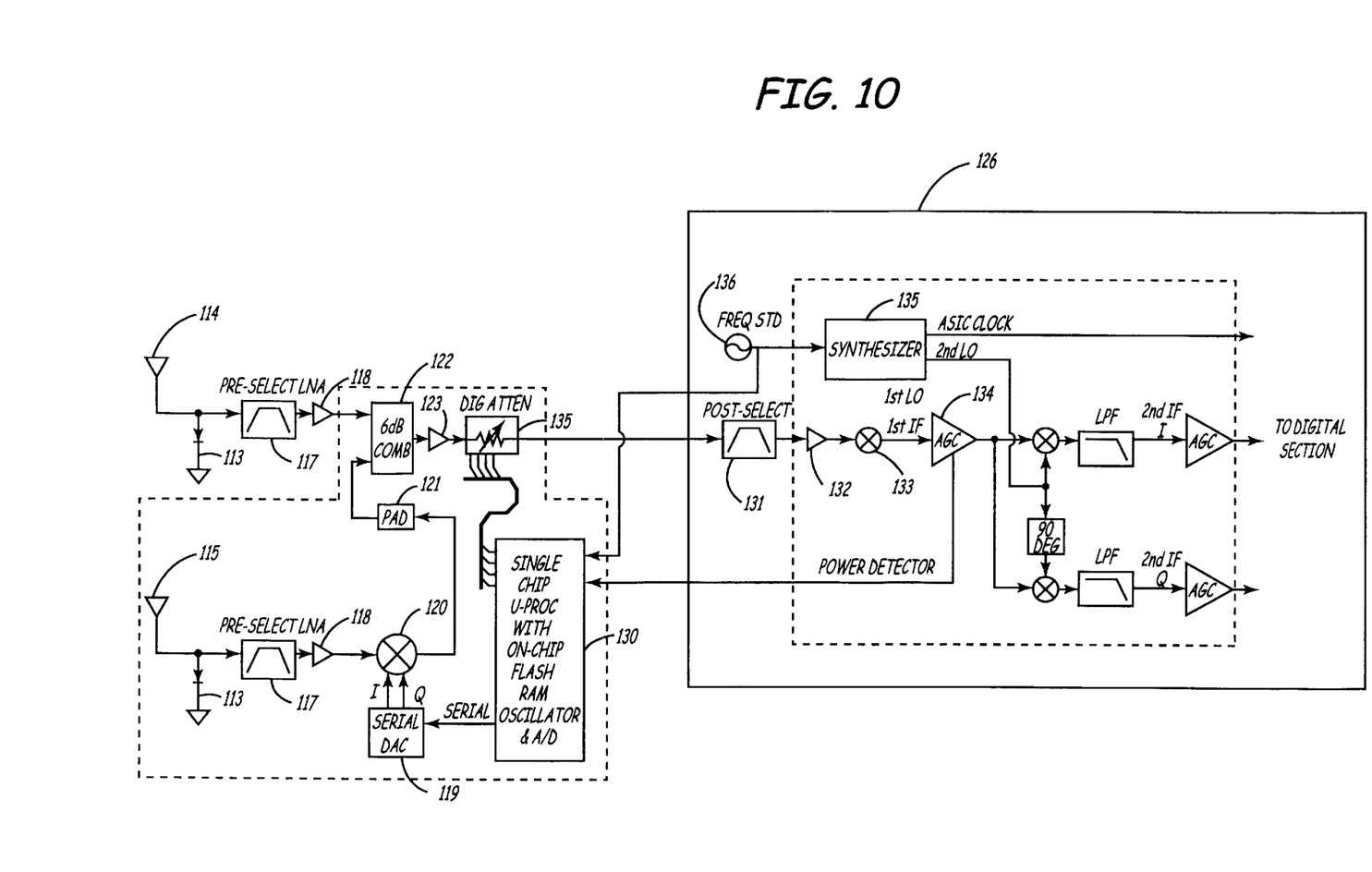
FIG. 10 is a detailed block diagram of the interference reduction system of FIG. 2.

FIG. 10 is a detailed block diagram of the interference reduction system 100 of FIG. 2. GPS and jammer signals are received by reference antenna 114. A burnout protection diode 113 may be connected to the antenna input to prevent damage to the system 100 from strong jamming and other signals. The output of the reference antenna 114 is filtered in preselect filter 117 that performs a bandpass function to pass the GPS signals and any in-band interfering and jamming signals. Low noise amplifier (LNA) 118 amplifies the input GPS signals as well as jamming signals. The output of the LNA 118 is connected to a summing element 122 that may be a 6-dB combiner. The secondary antenna 115 also receives GPS and jamming signals. Connected to the secondary antenna 115 is a burnout protection diode 113 and a preselect filter 117 as with antenna 114. An another LNA 118 is used to amplify the secondary antenna 115 signals.

Figure 11:
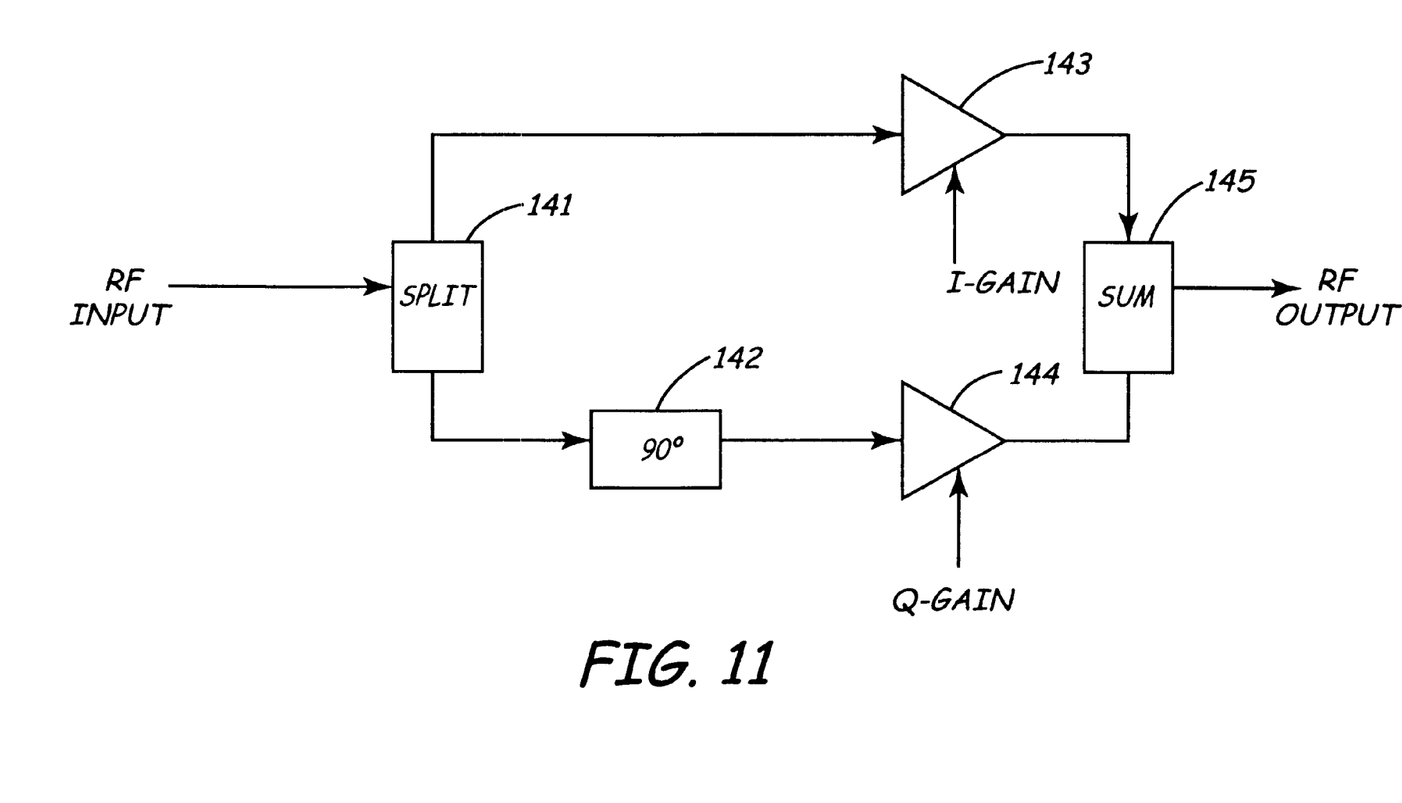
FIG. 11 is a block diagram of a complex weight circuit of FIG. 10.

The secondary antenna 115 signals from LNA 118 are processed in the complex weight circuit 120. A block diagram of the complex weight circuit is shown in FIG. 11. Splitter 141 divides the signal into in-phase (I) and quadrature (Q) signals. The quadrature signal is delayed 90 degrees in carrier phase by phase shift 142. Variable gain amplifiers 143 and 144 apply a varying gain (possibly zero or negative) to each signal component. The I and Q gain signals from the microprocessor 130 vary the gain of the variable gain amplifiers 143 and 144. The signal components are recombined in summer 145 and output. The complex weight circuit 120 affects a complex multiply between an in coming RF signal and the real and imaginary parts of the I and Q gain signal.

The output of the complex weight circuit 120 may be attenuated in a pad 121 and then passed to the summing element 122. In the summing element 122, the GPS signals from antennas 114 and 115 are added while any jamming signal from reference antenna 114 are added to phase and amplitude adjusted jamming signals from complex weight circuit 120 such that the jamming signals subtract to reduce or eliminate the jamming signals.

The output of the summing element 122 may be amplified in amplifier 123 before being passed to the digital attenuator 135 that keeps the signal level within the AGC range of the GPS receiver 126. The signals from the attenuator 135 are received by the GPS receiver 126 where they are filtered by a post selector 131 bandpass filter, amplified in amplifier 132, and down-converted to a first IF in mixer 133. Mixer 133 receives a first local oscillator (LO) signal from a frequency synthesizer 135. The first IF signal is amplified and processed in automatic gain control (AGC) circuit 134.

The AGC 134 functions as a AGC known in the art to provide a constant signal level to the I and Q circuit functions that follow. The I and Q outputs are then passed to a digital section (not shown) of the GPS receiver 126 for further processing. The AGC circuit 134 also provides a power detector function to detect the power level of any jamming signal. A power detector (not shown) in the AGC circuit 134 provides a power detector control signal proportional to the input level to control the gain of a voltage controlled amplifier (not shown) in the AGC circuit 134 as is know in the art. The power detector control output signal is fed back to the single chip microprocessor 130. In addition, a frequency standard 136 that provides a reference frequency to the synthesizer 135 also provides a clock for the microprocessor 130.

The microprocessor 130 digitizes the power detector signal from the AGC circuit 134 and processes it to generate a digital word on a serial data port. The digital word represents an I and Q signal needed to minimize the power detector output level. The digital word is converted to analog I and Q gain signals in serial digital to analog converter 119. The analog I and Q gain signals are used to control the I and Q levels of the secondary antenna 115 signal in the complex weight circuit 120 as discussed above. The microprocessor 130 examines the power detector signal and generates I and Q gain signals to null out or reduce the jammer signals as indicated by the power detector 133 signal level.

By using power detector signals and clock signals from the GPS receiver 126 and spin symmetrical antennas, the interference reduction system 100 of the present invention is able to achieve jamming and interference reduction at low cost. The interference reduction system 100 may also be implemented with a hand-held GPS receiver by using similar spin symmetrical antennas as used in artillery projectiles as described above. The antennas 114 and 115 may be oriented with their spin axis vertical and suppression of jamming signal will be optimized to signals received perpendicular to the spin axis or from the horizon. This is an advantage in hand held applications since most jammers are on the ground and hence aligned with the horizon in elevation.

It is believed that the low cost interference reduction system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An interference reduction system to reduce interfering signals in a global positioning system receiver comprising:
   a pair of antennas having a spin symmetric gain pattern for receiving global positioning system and interfering signals;
   an antijam electronics unit connected to the antennas for processing the received global positioning system and interfering signals and producing an output signal with reduced interfering signals; and
   the global positioning system receiver connected to the antijam electronics unit for processing the global positioning system signals into position solutions and for providing a power detector output and a clock signal to the antijam electronics unit to reduce the interfering signals.

2. The interference reduction system of claim 1 wherein the pair of antennas comprises a reference antenna and a secondary antenna.

3. The interference reduction system of claim 2 wherein the antijam electronics unit further comprises:
   a first amplifier and filter function connected to the reference antenna to filter and amplify the reference antenna received GPS and interfering signals;
   a second amplifier and filter function connected to the secondary antenna to filter and amplify the secondary antenna received GPS and interfering signals;
   a complex weight circuit connected to the second amplifier and filter function for adjusting the secondary antenna signal phase and gain using in-phase and quadrature gain signals;
   a summing function connected to the first amplifier and filter function and the complex weight circuit for adding the reference antenna signal to the adjusted secondary antenna signal to provide a summing function output signal with reduced interfering signals; and a microprocessor for receiving and measuring the power detector output from the GPS receiver and generating the in-phase and quadrature gain signals for the complex weight circuit.

4. The interference reduction system of claim 3 wherein the antijam electronics unit further comprises:

a digital attenuator connected to the output of the summing function and the microprocessor to vary the level of the summing function output signal to the GPS receiver to maintain a level within range of an AGC circuit in the GPS receiver; and a digital to analog converter connected to the microprocessor and the complex weight circuit to convert the in-phase and quadrature gain signals from digital to analog.

5. The interference reduction system of claim 1 wherein the GPS receiver further comprises an AGC function for controlling signal levels in the GPS receiver and for providing the power detector output signal.

6. The interference reduction system of claim 5 wherein the GPS receiver further comprises a frequency standard for providing the clock signals to the GPS receiver and the antijam electronics unit.

7. The interference reduction system of claim 1 wherein the antennas are slot antennas.

8. A low cost interference reduction system for a global positioning system receiver comprising:

a reference antenna for receiving global positioning system signals and the interfering signals;

a secondary antenna for receiving global positioning system signals and interfering signals;

a complex weight circuit for adjusting the secondary antenna received signal phase and gain with in-phase and quadrature gain signals;

a summing function for adding the reference antenna received signal to the adjusted secondary antenna received signal to reduce the interfering signals in the summing function output signal;

the global positioning system receiver for processing the received global positioning system signals into position solutions and for providing a power detector output and a clock signal; and a microprocessor for receiving the power detector output and the clock signal from the GPS receiver and generating the in-phase and quadrature gain signals for the complex weight circuit such that the interfering signals are reduced.

9. The interference reduction system of claim 8 further comprising:

a first amplifier and filter function connected to the reference antenna and the summing function to filter and amplify the GPS and jamming signals; and a second amplifier and filter function connected to the secondary antenna and the complex weight circuit to filter and amplify the GPS and jamming signals.

10. The interference reduction system of claim 8 further comprising:

a digital attenuator connected to the output of the summing function and the microprocessor to vary the level of the summing function output signal to the GPS receiver to maintain a level within range of an AGC circuit in the GPS receiver; and a digital to analog converter connected to the microprocessor and the complex weight circuit to convert the in-phase and quadrature gain signals from digital to analog.

11. The interference reduction system of claim 8 wherein the GPS receiver further comprises an AGC function for controlling signal levels in the GPS receiver and for providing the power detector output.

12. The interference reduction system of claim 8 wherein the GPS receiver further comprises a frequency standard for providing the clock signals to the GPS receiver and the microprocessor.

13. The interference reduction system of claim 8 wherein the antennas are slot antennas.

14. The interference reduction system of claim 8 wherein the antennas are circumferential band antennas.

15. The interference reduction system of claim 8 wherein the antennas are dual dipole antennas.

16. A method of reducing the effect of interfering and jamming signals on global positioning system signals in a GPS receiver comprising the steps of:

receiving global positioning system signals and the interfering signals with a reference antenna;

receiving global positioning system signals and interfering signals with a secondary antenna;

adjusting the secondary antenna received signal phase and gain using in-phase and quadrature gain signals in a complex weight circuit;

adding the reference antenna received signal to the adjusted secondary antenna received signal in a summing function to reduce the interfering signals in a summing function output signal;

processing the global positioning system signals into position solutions in the GPS receiver;

providing a power detector output and a clock signal from the GPS receiver;

receiving the power detector output and the clock signal from the GPS receiver in a microprocessor; and generating the in-phase and quadrature gain signals for the complex weight circuit in the microprocessor such that the interfering signals are reduced.

17. The method of reducing the effect of interfering and jamming signals on global positioning system signals in a GPS receiver of claim 16 further comprising the steps of:

filtering and amplifying the GPS and jamming signals in a first amplifier and filter function connected to the reference antenna and the summing function; and filtering and amplifying the GPS and jamming signals in a second amplifier and filter function connected to the secondary antenna and the complex weight circuit.

18. The method of reducing the effect of interfering and jamming signals on global positioning system signals in a GPS receiver of claim 16 further comprising the steps of:

varying the level of the summing function output signal to the GPS receiver to maintain a level within range of an AGC circuit in the GPS receiver with a digital attenuator connected to the output of the summing function and the microprocessor; and converting the in-phase and quadrature gain signals from digital to analog in a digital to analog converter connected to the microprocessor and the complex weight circuit.

19. The method of claim 16 further comprising the steps of:

controlling signal levels in the GPS receiver with an AGC function; and providing the power detector output from the AGC function in the GPS receiver.

20. The method of claim 16 further comprising the step of providing the clock signals to the GPS receiver and the microprocessor from a frequency standard in the GPS receiver.

* * * * *